United States Patent Office 2,927,132
Patented Mar. 1, 1960

2,927,132

1-(4-AMINO-2-ALKOXYPHENOXY)-BENZAMIDO-ALKANES

Harry James Barber, Gidea Park, Raymond Frederick Collins, Harold Wood, and Michael Davis, Upminster, England, assignors to May & Baker Limited, Dagenham, England, a British company No Drawing. Application October 21, 1957
Serial No. 691,133

Claims priority, application Great Britain May 19, 1955

2 Claims. (Cl. 260—558)

This invention is for improvements in or relating to amines and to processes for their production and has for its object the provision of new, therapeutically active substances. It is a continuation-in-part of application No. 585,164 filed May 16, 1956 and now abandoned.

In the specification of our copending applications Nos. 503,820 (now abandoned), and 573,656 (now Patent No. 2,830,008) we have claimed N-p-aminophenoxyalkyl and N-p-aminophenoxyalkenyl-amides (together with their derivatives) represented by the general formula:

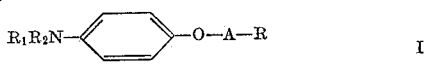

wherein $R_1$ and $R_2$ are the same or different and each represents a hydrogen atom or a lower alkyl, hydroxyalkyl (including polyhydroxyalkyl) or alkoxyalkyl group, A represents an unbranched saturated or ethylenically unsaturated hydrocarbon chain containing not less than five and not more than nine carbon atoms, and R represents a mono- or di-acylamido group, which may be derived from an aliphatic, aromatic or heterocyclic acid, including dicarboxylic acids (which may give imides, mono-amides and diamides), sulphonic acids and mixed sulphonic-carboxylic acids. These acids may contain substituents such as chlorine atoms or methoxy groups. Where the amide nitrogen atom bears only one carbonyl or sulphonyl group it may also be substituted by an alkyl, aralkyl, aryl, cycloalkyl or heterocyclic group.

The aforesaid compounds, including not only the N-p-amino compounds but also their acid addition salts and simple derivatives such as formaldehyde bisulphite addition products of the primary amines, have valuable therapeutic properties, particularly in the treatment of bilharziasis.

In accordance with the invention it has now been found that similar valuable therapeutic properties are possessed by compounds of the general formula

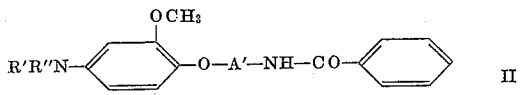

where R' and R" each represent a member of the class consisting of the hydrogen atom and methyl, ethyl, hydroxyethyl and hydroxypropyl groups, A' is a polymethylene chain of 5 to 8 carbon atoms. It will be noted that the compounds apart from being a narrower group than that referred to above, are characterised by a methoxy group ortho to the ether linkage.

The said new compounds are of particular value in the treatment of bilharziasis. They may be prepared and used in the form of their acid addition salts formed with pharmaceutically acceptable anions and such salts are within the scope of the present invention. Also within the scope of the present invention are amine derivatives such as those commonly used in pharmeceutical practice, such as formaldehyde bisulphite addition products. A compound of particular importance is 1-(4-amino-2-methoxyphenoxy)-5-benzamidopentane.

It has been found that undesirable ocular toxic effects are manifested by compounds of the aforesaid formula not containing the methoxy group which are not manifested by the methoxy-substituted compounds. This is illustrated by comparative tests on (A) 1-(4-amino-phenoxy)-5-benzamido pentane and (B) 1-(4-amino-2-methoxyphenoxy)-5-benzamido pentane. These compounds differ solely by the presence of the methoxy group in the latter, which is a compound according to the present invention. Cats were used as test animals because of the close similarity of the cats' nervous system with the human nervous system. The compounds were administered as their methane sulphonate addition salts. Administering A at a single oral dose of 400 mg./kg. of animal weight, it is found that evidence of ocular toxicity was produced in ¾ of the test animals. This toxicity was manifested by loss of the blink reflex and marked dilation of the pupils with almost complete loss of the pupilliary, light and near reflexes. Visual perception as judged by the animals' behaviour was also impaired within twenty-four hours. This toxic reaction would appear to be localised in the ocular nerve centers for if the compound was acting centrally all of the optic centres would be affected, but this seemed improbable in the absence of other central nervous symptoms. Administration of the compound B at twice the above mentioned dose level, namely, 800 mg./kg. of body weight, produced no symptoms of ocular toxicity in the test animals nor was any produced following administration of 4 doses daily each of 400 mg./kg. of body weight.

The aforesaid new compounds may be prepared in various different ways, expressed generically as the condensation of a compound of the formula

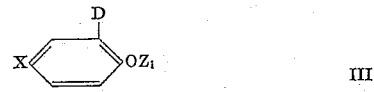

with a compound of the formula $Z_2Y$, wherein D represents a methoxy group or a group convertible into a methoxy group, e.g. a hydroxyl group, X represents the group NR'R" or an atom or group capable of being replaced by or converted into a group NR'R", Y represents a benzamido group or an atom (e.g. a halogen atom) or group which can be replaced by or converted into a benzamido group and $Z_1$ and $Z_2$ are atoms or groups capable of reacting together to produce an —O—A"— linkage in which A" represents the group A' or a corresponding less saturated hydrocarbon linkage. If necessary, the groups X and Y are then converted into the groups NR'R" and benzamido respectively, the group A" is reduced to form the group A' and, also if necessary, D is converted into the required methoxy group. Examples of groups which may be represented by $Z_1$ and $Z_2$ are hydrogen and alkali metal atoms and the groups Q—A"—where Q represents the residue of a reactive ester such as a methanesulphonate radical or a halogen atom.

Among the groups which may be represented by X are:

(a) groups convertible into primary amino groups: acylamido, carbonamido, nitro, nitroso, alkoxycarboxylamido, anil and arylazo groups;

(b) groups convertible into secondary amino groups: anil, alkoxycarbonylamido and acylamido groups (by reduction) and acylalkylamido groups (by hydrolysis); and (c) tertiary amino groups or groups convertible into tertiary amino groups in the form of quaternary ammonium groups (by pyrolysis) and acylalkylamido groups (by reduction).

Examples of groups which may be represented by Y are, apart from benzamido itself, (a) acetamido, diacetamido, phthalimido and benzene sulphonamido. Each such acylamido group may be converted into benzamido by hydrolysis (or in the case of the phthalimido group, by treatment with hydrazine) and subsequent benzoylation; and (b) a nitro group whih may be converted by reduction and subsequent benzoylation.

Specific embodiments of the process for the preparation of compounds of Formula II are as follows:

(1) Reaction of a compound of the general formula:

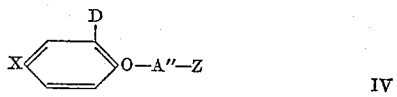
IV wherein Z represents a residue of a reactive ester, such as a halogen atom, and X, D and A″ are as hereinbefore defined, with a compound of the formula

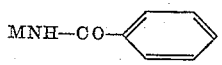

where M represents a hydrogen atom or an alkali metal.

(2) Reaction of a compound of the general formula:

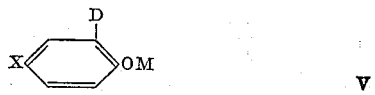
V wherein X, D and M are as hereinbefore defined, with a compound

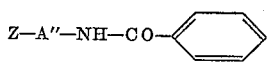

wherein Z and A″ are as hereinbefore defined.

In addition, compounds of the foregoing general formula and containing primary or secondary amino groups may be converted into products containing more highly substituted amino groups by known methods. For example, a product containing a primary amino group may be reacted with an alkylating agent or alkylene oxide.

It is not of course, necessary that X when not identical to MR′R″ shall be convertible into NR′R″ or replaceable thereby in a single step. Thus, if X represents a hydrogen atom the resulting condensation product may first be nitrated (by means of nitric acid) whereafter the nitro group is reduced to amino and, if required, the resultant amine is alkylated. The same considerations apply to the radical Y.

The present invention includes within its scope pharmaceutical preparations containing one or more compounds of the aforesaid general Formula II or an acid addition salt or other simple derivative thereof for use in the treatment of bilharziasis in which the active material is associated with a pharmaceutical carrier which may be either a solid material or liquid. The compositions may take the form of elixirs or of tablets, powders, capsules, or other dosage forms which are particularly suitable for oral ingestion. Liquid diluents are employed in sterile condition for parenteral use, that is, by injection; suitable such diluents include water. The compositions of the invention may take the form of active material, admixed with solid diluents and/or excipients such as starch, lactose, talc, stearic acid, magnesium stearate, gums or the like. Any of the tabletting materials used in pharmaceutical practice may be employed where there is no possibility of incompatibility with the active therapeutic agent. Alternatively, the active therapeutic agent may, with or without is adjuvant material, be placed in the usual capsule or resorbable material such as the usual gelatin capsule and administered in that form.

The invention is illustrated by the following example:

*Example*

1 - (2-methoxy-4-nitrophenoxy)-5-phthalimidopentane (100 g.) and hydrazine hydrate (60%; 45 ml.) were refluxed in ethanol (300 ml.) for 3 hours. The solvent was evaporated off, and the residue was shaken with warm 2 N sodium hydroxide (700 ml.) and chloroform (200 ml.). The chloroform was separated and the alkaline solution was extracted with a further 200 ml. The combined extracts were washed, dried and evaporated and the residue was crystallised from petroleum ether (B.P. 100–120° C.), yielding 1-(2-methoxy-4-nitrophenoxy)-5-aminopentane, M.P. 80–81° C.

A suspension of the foregoing amine (25.4 g.) in excess of dilute sodium hydroxide was stirred whilst benzoyl chloride (17.5 g.) was slowly added. After one hour, the solid was filtered off, washed with water and recrystallised from ethanol, giving 1-(2-methoxy-4-nitrophenoxy)-5-benzamidopentane, M.P. 131–132° C. Reduction of this nitro compound in ethanol over platinum oxide and recrystallisation of the product from benzene gave 1-(4-amino-2-methoxyphenoxy)-5-benzamidopentane, M.P. 103–104° C.

The 1 - (2-methoxy-4-nitrophenoxy-5-phthalimidopentane, M.P. 147.5–148.5° C., used as starting material was itself prepared from 2-methoxy-4-nitrophenol (24 g.), 5-phthalimidopentyl bromide (42.1 g.) and sodium hydroxide (5.7 g.) in water (15 ml.) and 2-ethoxyethanol (75 ml.).

We claim:

1. A compound of the general formula:

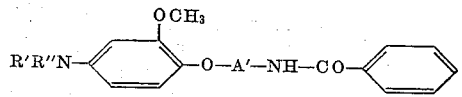

wherein R′ and R″ each represent a member of the class consisting of the hydrogen atom and methyl, ethyl, hydroxyethyl and hydroxypropyl groups and A′ is a polymethylene chain of 5 to 8 carbon atoms, the said compounds being useful in the treatment of bilharziasis.

2. 1-(4-amino-2-methoxyphenoxy)- 5- benzamidopentane.

References Cited in the file of this patent

UNITED STATES PATENTS

| | | |
|---|---|---|
| 2,552,241 | Weissberger et al. | May 8, 1951 |
| 2,765,338 | Suter et al. | Oct. 2, 1956 |
| 2,773,899 | Martin et al. | Dec. 11, 1956 |

OTHER REFERENCES

Matejka et al.: Jour. Chem. Soc. (London) pp. 1322–26 (1934).

Chem. Abstracts, vol. 39, p. 2287 (1945), citing Belosvetov J. Gen. Chem. (U.S.S.R.), vol. 14, pp. 216–225 (1945).

Beilstein Handbook, 4th ed., Bd. XIII, 2nd Suppl. p. 465 (1950).